United States Patent Office 3,370,144
Patented Feb. 20, 1968

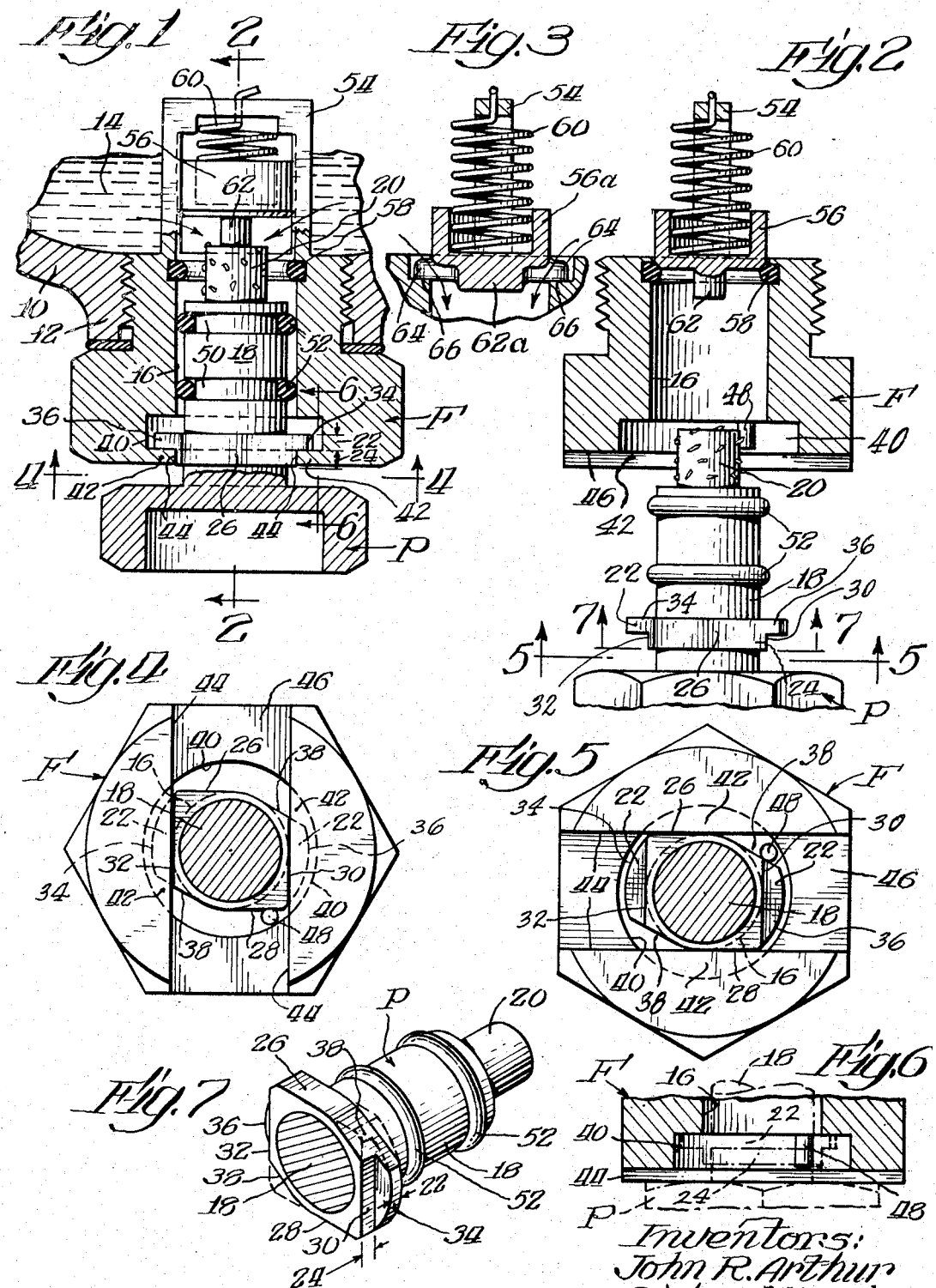

3,370,144
SECURING MEANS FOR PLUGS AND THE LIKE
John R. Arthur and Richard K. Graham, Clarinda, Iowa, assignors to Lisle Corporation, Clarinda, Iowa, a corporation of Iowa
Filed June 23, 1965, Ser. No. 466,160
3 Claims. (Cl. 210—222)

ABSTRACT OF THE DISCLOSURE

Means of coaction between a plug and a fitting to quickly and positively connect the plug in fluid tight relationship to the fitting or disconnect it therefrom with no more than 90° of rotation of the plug relative to the fitting. Certain flanges of the plug coact with flanges of the fitting to accomplish locking the one to the other and their proper alignment is insured in both the locked and unlocked positions by means of a stop. The plug carries a magnet for attraction of ferrous particles from fluid or the like within the housing to which the fitting is applied.

---

This invention relates to securing means for plugs and the like which is comparatively simple to manufacture and to operate, and efficiently and positively holds the plug in locked position relative to a tubular fitting or the like.

One object of the invention is to provide securing means for a plug relative to a fitting which is operable by insertion of the plug in a bore of the fitting in a predetermined rotational orientation which constitutes an unlocked position whereupon the plug is rotated from the unlocked position to a locked position, and then held in the locked position by slight outward movement of the plug relative to the fitting under the force of means biasing the plug outwardly relative to the fitting.

Another object is to provide connecting means for a plug relative to a fitting wherein the plug has primary and secondary flanges for holding and locking purposes, respectively, and the fitting has an arrangement of recess and holding flanges cooperable with the primary and secondary flanges of the plug in such manner as to provide positive locking of the plug in the fitting, and an unlocking procedure, the steps of which must be performed in a specific manner in order to release the plug relative to the bore of the fitting.

Still another object is to provide a plug with a pair of flanges, one of which is polygonal in outline and the other of which is substantially the same polygonal outline plus a pair of opposite flange-like locking projections, the plug being adapted to be received in a recess of a fitting wherein the flanges may rotate to locking and unlocking positions, the fitting having a pair of holding flanges adapted to overlie the locking projections of the plug in locked position thereof, and the polygonal outline-shaped flange being receivable between the inner edges of the holding flanges in either of the locked or unlocked positions of the plug so that means biasing the plug outwardly when in locked position secures the plug against accidental rotation to unlocked position by entry of the polygonal outline-shaped portion between the inner edges of the holding flanges. Thereafter, upon inward movement of the plug against the force of the bias rotation from locked to unlocked position is possible so that the plug can be withdrawn from the fitting.

A further object is to provide the plug with sealing means to cooperate with the bore of the fitting to prevent flow of fluid from the bore when the plug is in locked position.

Still a further object is to provide securing means of the character disclosed for a magnetic plug which attracts ferrous particles from liquid adjacent the inner end of the fitting when the fitting is mounted in a transmission housing or the like so that foreign magnetic particles may be deposited on the magnet of the plug and the plug withdrawn from the fitting when desired for cleaning the foreign particles therefrom.

An additional object is to provide the fitting with a self-closing valve to prevent the outflow of liquid from the housing when the magnetic plug is removed for cleaning the foreign particles therefrom.

Another additional object is to utilize the spring of the self-closing valve as a means to bias the plug outwardly to locked position.

With these and other objects in view, our invention consists in the construction, arrangement and combination of the various parts of our securing means for plugs and the like, whereby the objects above contemplated are attained, as hereinafter more fully set forth, pointed out in our claims, and illustrated in detail on the accompanying drawing, wherein:

FIG. 1 is a sectional view through a transmission housing or the like and a fitting having a plug therein, the fitting and plug being provided with our securing means and the plug being shown in locked position, a magnetic type plug having a self-closing type valve being illustrated;

FIG. 2 is a sectional view on the line 2—2 of FIG. 1 showing the plug unlocked and withdrawn from the fitting;

FIG. 3 is a sectional view similar to a portion of FIG. 2 showing a modification wherein the self-closing valve is eliminated;

FIG. 4 is a sectional view on the line 4—4 of FIG. 1 and shows the unlocked position of the parts;

FIG. 5 is a sectional view on the line 5—5 of FIG. 2 and shows the unlocked position of the parts;

FIG. 6 is a sectional view similar to portions of FIG. 2 showing the plug in locked position; and FIG. 7 is a perspective view of the plug with a portion thereof cut off on the section line 7—7 of FIG. 2.

On the accompanying drawing we have used the reference numeral 10 to indicate a transmission housing or the like having a boss 12 threaded to normally receive a drain plug. Liquid is illustrated at 14 such as oil or the like in a transmission housing. In place of the usual drain plug we illustrate a tubular fitting F having a bore 16 in which is a plug P.

The plug illustrated has a permanent magnet 20 for the purpose of attracting ferrous particles from the liquid 14, and after an accumulation thereof the particles may be removed. For this purpose the plug P is arranged so that it can be withdrawn from the fitting F and the present invention involves particularly a releasable securing means for the plug with respect to the fitting.

The securing means referred to comprises on a cylindrical portion 18 of the plug P a primary flange 22 and a secondary flange 24. Each flange has certain characteristics and the flanges are cooperable with an annular recess 40 of special design in the fitting F as will now be described.

The secondary flange 24 has a pair of opposite edges 26 and 28 and another pair of opposite edges 30 and 32. The edges 26 and 28 are substantially parallel to each other and the edges 30 and 32 are substantially parallel to each other, the edges 30 and 32 being shown at right angles to the edges 26 and 28 in the drawings although they may be arranged at other angles and still use the securing principle involved. As shown dotted in FIG. 7 an original square outline is shown for the flange 24 and the flange 22 is similar with the exception that added to it are a pair of opposite flange-like locking projections 34 and 36. The primary flange 22 and the secondary flange 24 are cut off at an angle as shown at 38 for the purpose of accommodating a stop pin 48 as will hereinafter appear whereas the square outline could be retained if no stop pin were provided.

The annular recess 40 of the fitting F is adapted to receive the flanges 22 and 24 as shown by dotted lines in FIG. 6. A pair of holding flanges 42 (see FIG. 1) overhang the recess and have inner edges 44 which define a cross groove 46 (see FIG. 4) in the outer end of the fitting F. The depth of the recess 40 is slightly greater than the total thickness of both flanges 22 and 24 as evident from the dotted showing in FIG. 6.

The cylindrical portion 18 of the plug P is provided with O-ring grooves 50 in which are O-rings 52 for sealing purposes. The O-rings coact with the bore 16 as shown in FIG. 1.

The fitting F is illustrated as having a yoke 54 to serve as a guide for a valve cup 56 which under the action of a spring 60 seats against an O-ring 58 as shown in FIG. 2 when the plug P is removed. When the plug is inserted into the fitting F the magnet 20 engages a projection 62 from the lower surface of the valve cup 56 and forces the cup up to the position of FIG. 1 against the bias of the spring 60. The arrangement just described permits ferrous particles to enter from the liquid 14 in FIG. 1 to the yoke as indicated by arrows for deposit on the magnet 20. When the plug P is removed as in FIG. 2, however, the valve cup 56 seals against the O-ring 58 so that the oil 14 is not lost or drained out while the ferrous particles are being cleaned from the magnet.

FIG. 3 illustrates a modified construction in which a cup 56a does not act as a valve but merely as a spring seat. The cup 56a has a pair of projections 64 to seat on an annular shoulder 66 when the plug P is removed whereupon as indicated by arrows in this figure the oil drains out of the transmission housing past the projections. Thus, the plug may act as a drain valve by permitting outflow of oil when the plug is removed. Our novel securing means of the present invention may thus be used in different environments and is not limited to a magnetic plug and a self-closing valve such as illustrated in FIGS. 1 and 2.

The operation of our securing means will now be described. In FIGS. 1 and 4 it is shown in the locked position. The edge 28, it will be noted, is against the stop pin 48 and the stop pin thus limits the clockwise rotation of the flanges 22 and 24 in the locked position, in which position the opposite edges 30 and 32 of the flange 24 are aligned with the inner edges 44 of the holding flanges 42. Accordingly, the secondary flange 24 can be in the same plane as the holding flanges 42 as shown in FIG. 1 and are forced to this position and held there by the bias of the spring 60 in an obvious manner. The plug P, however, can be pushed upwardly till the top of the flange 22 is stopped by the bottom surface of the recess 40 (the dotted position shown in FIG. 6) and thereafter the plug may be rotated relative to the fitting until the flange-like locking projections 34 and 36 are aligned with the groove 46 as shown in FIG. 5 which permits the entire plug to be pulled down and out of the fitting as illustrated in FIG. 2. In this counterclockwise rotated unlocking position it will be noted one of the cutoff portions 38 of the flanges 22 and 24 engages the stop pin 48 in unlocked position so that the operator knows the edges 26 and 28 of the flanges 22 and 24 are properly aligned with the inner edges 44 of the holding flanges 42 to permit removal of the plug from the fitting.

From the foregoing specification it will be obvious that we have provided a securing means which can be locked and unlocked to either secure a plug within a fitting or permit removal of the plug from the fitting. The operational steps involve proper rotational orientation of the plug relative to the fitting so that the flanges 22 and 24 can be entered into the recess 40 whereupon a predetermined amount of rotation in the proper direction brings the locking projections 34 and 36 into alignment with the holding flanges 42 to prevent outward movement of the plug relative to the fitting, and upon rotation to the position shown in FIG. 4 the plug will be forced downwardly to the position shown in FIG. 1 by the spring 60. At this time the flange 24 is aligned with the holding flanges 42 so that the plug cannot be rotated back to unlocked position except by first pressing inwardly against the bias of the spring 60 to rotationally unlock the plug. Thus, a positive lock is provided for the plug relative to the fitting yet the plug can be quickly unlocked and removed and likewise quickly inserted and locked in position.

Some changes may be made in the construction and arrangement of the parts of our securing means for plugs and the like without departing from the real spirit and purpose of our invention, and it is our intention to cover by our claims any modified forms of structure or use of mechanical equivalents which may reasonably be included within their scope.

We claim as our invention:

1. In securing means of the character disclosed, the combination of a tubular fitting, a normally seated valve carried thereby, a plug having an elongated shank for entry into and withdrawal from the bore of said fitting, said shank when in fully inserted position within said bore, engaging and effecting unseating of said valve, connecting means operable to connect said plug to said fitting comprising primary and secondary flanges on said plug, said secondary flange having a polygonal outline, said primary flange having substantially the same polygonal outline and a pair of opposite flange-like locking projections beyond such outline, said fitting having a recess to receive said primary and secondary flanges and permit rotation thereof in said recess to locking and unlocking positions, said fitting having outwardly of recess a pair of holding flanges adapted to overlie said locking projections of said plug in the locking position thereof and said secondary flange being receivable between the facing edges of said holding flanges in either the locked or unlocked position of said plug, means biasing said plug outwardly when in locked position whereupon said secondary flange enters between said facing edges of said holding flanges to prevent rotation of said plug to unlocked position except upon inward movement of the plug against the force of said means biasing said plug outwardly, and a ring seal adapted to coact between said shank and said bore, said ring seal being so positioned that it becomes operable upon insertion of said shank into said bore and before said shank engages said valve.

2. Securing means for plugs and the like according to claim 1 wherein said plug is provided with a magnet projecting inwardly from said plug and located inwardly of said ring seal to attract ferrous particles from liquid adjacent the inner end of said fitting when the fitting is mounted in a housing or the like.

3. In securing means of the character disclosed, the combination of a tubular fitting, a plug for entry into and withdrawal from the bore of said fitting, and connecting means operable to connect said plug to said fitting comprising primary and secondary flanges on said plug, said secondary flange having two pairs of opposite edges, said primary flange having a pair of opposite flange-like locking projections extending radially outward in relation to one of said pairs of opposite edges, said fitting having a recess to receive said primary and secondary flanges and permit rotation thereof in said recess to locking and unlocking positions, said fitting having outwardly of said recess a pair of holding flanges adapted to overlie said locking projections of said primary flange in the locking position thereof, one pair of said opposite edges being receivable between the facing edges of said holding flanges when said plug is in locked position and the other pair of said opposite edges being receivable between the facing edges of said holding flanges when said plug is in unlocked position, a stop in said recess engaged by said flanges in both the locked and unlocked positions thereof and located so as to align said one pair of said opposite edges between said facing edges of said holding flanges in said locked position and so as to align said other pair of said opposite edges between said facing edges of said holding flanges in said unlocked position, and means biasing said plug outwardly when in locked position whereupon said secondary flange enters between said pair of locking flanges to prevent rotation of said plug to unlocked position except upon inward movement of the plug against the force of said means biasing it outwardly.

References Cited
UNITED STATES PATENTS

| | | | |
|---|---|---|---|
| 1,088,287 | 2/1914 | Lockwood | 287—103 |
| 2,704,156 | 3/1955 | Botstiber | 210—222 |
| 2,832,699 | 2/1958 | Willis | 285—376 X |

SAMIH N. ZAHARNA, *Primary Examiner.*

F. MEDLEY, *Examiner.*